United States Patent [19]

Chomet

[11] Patent Number: 4,645,873
[45] Date of Patent: Feb. 24, 1987

[54] TRANSACTIONAL TELECOMMUNICATION SYSTEM

[75] Inventor: Marc Chomet, Huntington, N.Y.

[73] Assignee: Telecue Systems, Huntington, N.Y.

[21] Appl. No.: 694,134

[22] Filed: Jan. 23, 1985

[51] Int. Cl.⁴ .......................................... H04M 11/00
[52] U.S. Cl. ...................................... 379/93; 364/900; 379/102
[58] Field of Search ................ 179/2 CA, 2 DP, 2 A, 179/5.5, 18 B; 364/200 MS File, 900 MS File, 401

[56] References Cited

U.S. PATENT DOCUMENTS

| | | | |
|---|---|---|---|
| 3,614,328 | 10/1971 | McNaughton et al. | 179/2 DP |
| 3,976,840 | 8/1976 | Cleveland et al. | 179/2 DP |
| 4,165,446 | 8/1979 | Flowers et al. | 179/2 DP |
| 4,360,875 | 11/1982 | Behnke | 364/900 |
| 4,506,111 | 3/1985 | Takenouchi et al. | 179/2 DP X |
| 4,531,023 | 7/1985 | Levine | 179/2 DP X |
| 4,559,415 | 12/1985 | Bernard et al. | 179/2 DP |
| 4,577,062 | 3/1986 | Hilleary et al. | 179/2 A |

FOREIGN PATENT DOCUMENTS

| | | | |
|---|---|---|---|
| 1162336 | 2/1984 | Canada | 179/2 DP |
| 32410 | 7/1981 | European Pat. Off. | 179/2 DP |
| 2842777 | 4/1980 | Fed. Rep. of Germany | 358/85 |

OTHER PUBLICATIONS

Ch. A. Maurer, "Videotex System for Trial Service in Switzerland", *Electrical Communications*, vol. 58, No. 2, 1983, pp. 169-173.
Sharpless et al, "An Advanced Home Terminal for Interactive Data Communication", 1977, International Conference on Communications, Chicago, Il., 12-15 Jan. 1977, pp. 19.6-19.47 to 19.6-19.50.

*Primary Examiner*—Keith E. George
*Attorney, Agent, or Firm*—Erwin S. Teltscher; Peter R. Ruzek

[57] ABSTRACT

A transactional system serves subscribers in a plurality of localities, and includes a national data base having a plurality of groups of addressed segments of data storage. Each group stores data pertaining to an associated locality, and each group is addressed by a locality number. There are provided a plurality of access-number addressed segments of data storage, and a device for linking the access-number addressed segments of data storage to the groups of locality-number addressed segments of data storage. At least one locality includes a plurality of sublocalities, and each locality number has a predetermined number of digits signifying the respective locality, and at least one additional digit for identifying the sub-locality; the latter may identify the zip code number. The groups of addressed segments of data storage preferably include classified ad sections. The linking device includes an apparatus for retrieving the subscriber zip code from the zip code addressed segments of data storage, a device for counting the number of ads in addressed segments of data storage, and a device for transmitting to a subscriber controlled data access unit the counted ads. The subscriber controlled data access unit includes a plurality of subscriber units, each having a locality number corresponding to its geographic location. Each subscriber has an access number, a device for transmitting the access number to the national data base, a display for displaying locality data, and a device for the national data base to receive and process the access-numbers.

10 Claims, 6 Drawing Figures

TRANSACTIONAL TELECOMMUNICATION SYSTEM

FIELD OF THE INVENTION

The invention relates to telecommunication systems and, more particularly, to transactional systems wherein the subscriber can furnish information to, and receive information from a data base.

BACKGROUND OF THE INVENTION

Presently telecommunications systems that supply information to individual subscribers operate on a time fee basis. The subscriber pays for the service, and the telephone connection to the computer by the hour or minute. Further, if these systems are national in scope, they do not emphasize the subscriber's locality and/or local information. On the other hand, these systems that are local do not permit viewing information on a national scale or in another locality.

SUMMARY OF INVENTION

The present invention is a transactional system which serves subscribers in a plurality of localities. Mainly, it consists of a national data base having a plurality of groups of locality storage locations. Each group stores data pertaining to an associated one of the localities served by the system and is addressable by a locality number. The national data base further has a plurality of access number storage locations, each assigned to one of the subscribers. The access number storage locations are linked to the groups of locality storage locations so that locality data stored in the associated one of the locality storage locations is automatically addressed upon receipt of one of the access numbers. The system further consists of a number of subscriber units, each having a locality number corresponding to its geographic location. Each subscriber has an access number which he transmits to the national data base when he wishes to receive locality data. Each subscriber unit also has a display screen on which the data received from the national data base can be displayed.

The system of the present invention allows electronic mail to be exchanged among its subscribers, the purchase of items displayed on the screen, furnishing of statistical data to vendors regarding the items viewed by the subscribers, and a variety of other services such as connection to other data bases.

The novel features which are considered as characteristic of the invention are set forth in particular in the appended claims. The invention itself, however, both as to its construction and its method of operation, together with additional objects and advantages thereof, will best be understood from the following description of a preferred embodiment when read in connection with the accompanying drawings.

DESCRIPTION OF THE PREFERRED EMBODIMENT

Figure 1:
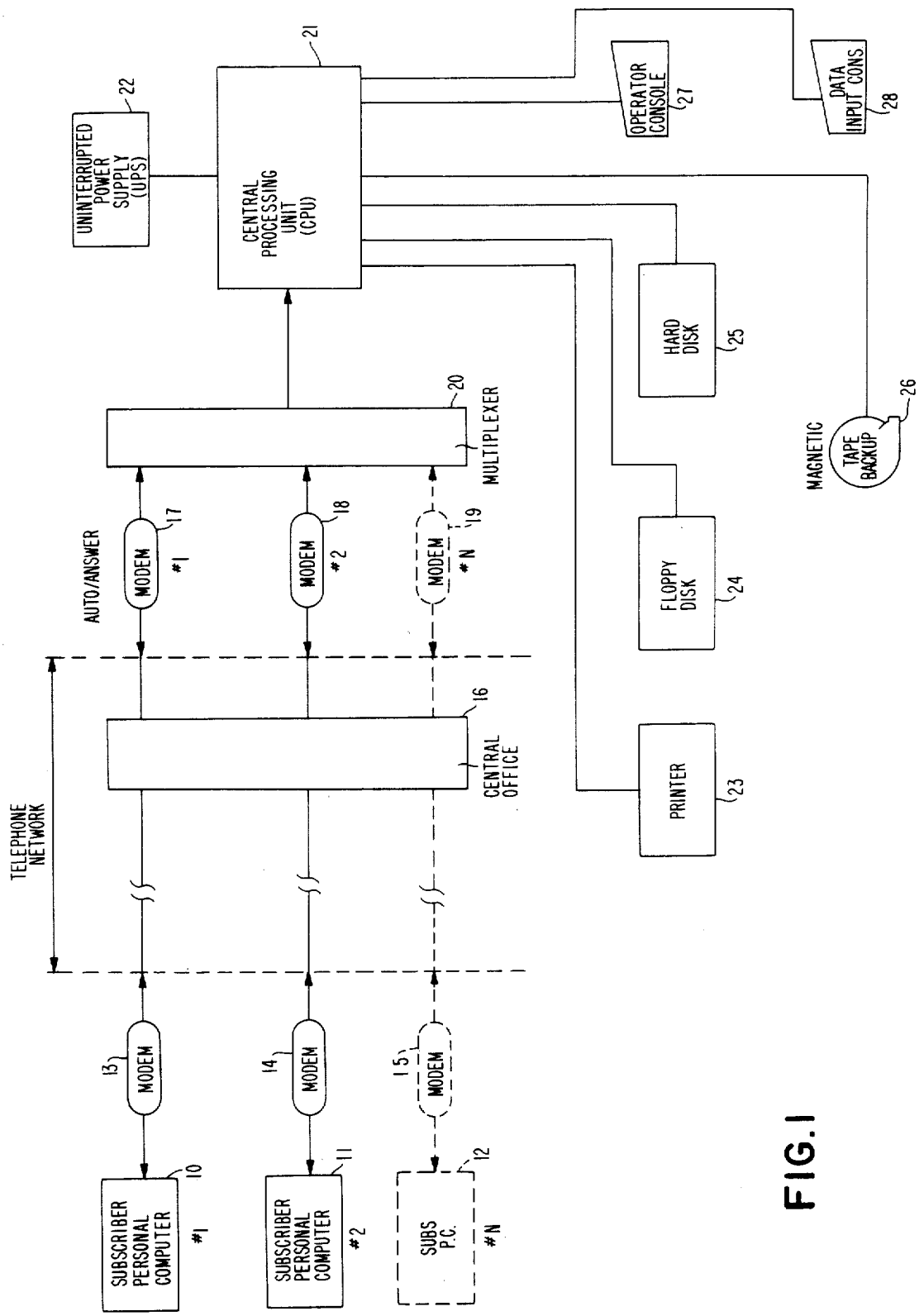
FIG. 1 is in overall block diagram of the system of the present invention.

The overall block diagram for the novel communications system of the present invention is illustrated in FIG. 1. As illustrated there, a number of subscribers, each having a personal computer 10, 11, 12, respectively, are connected to the telephone line through modems 13, 14, and 15, respectively. The calls reach the central telephone office 16, and are passed through modems 17, 18, 19 and a multiplexer 20 to the central processing unit 21 of the central computer. The central processing unit 21 is powered by a power supply 22, and controls a printer 23, a plurality of floppy disks 24, hard disks 25 and a magnetic tape backup 26. The central processing unit receives an input from an operator console 27, and a data input console 28.

Figure 2:
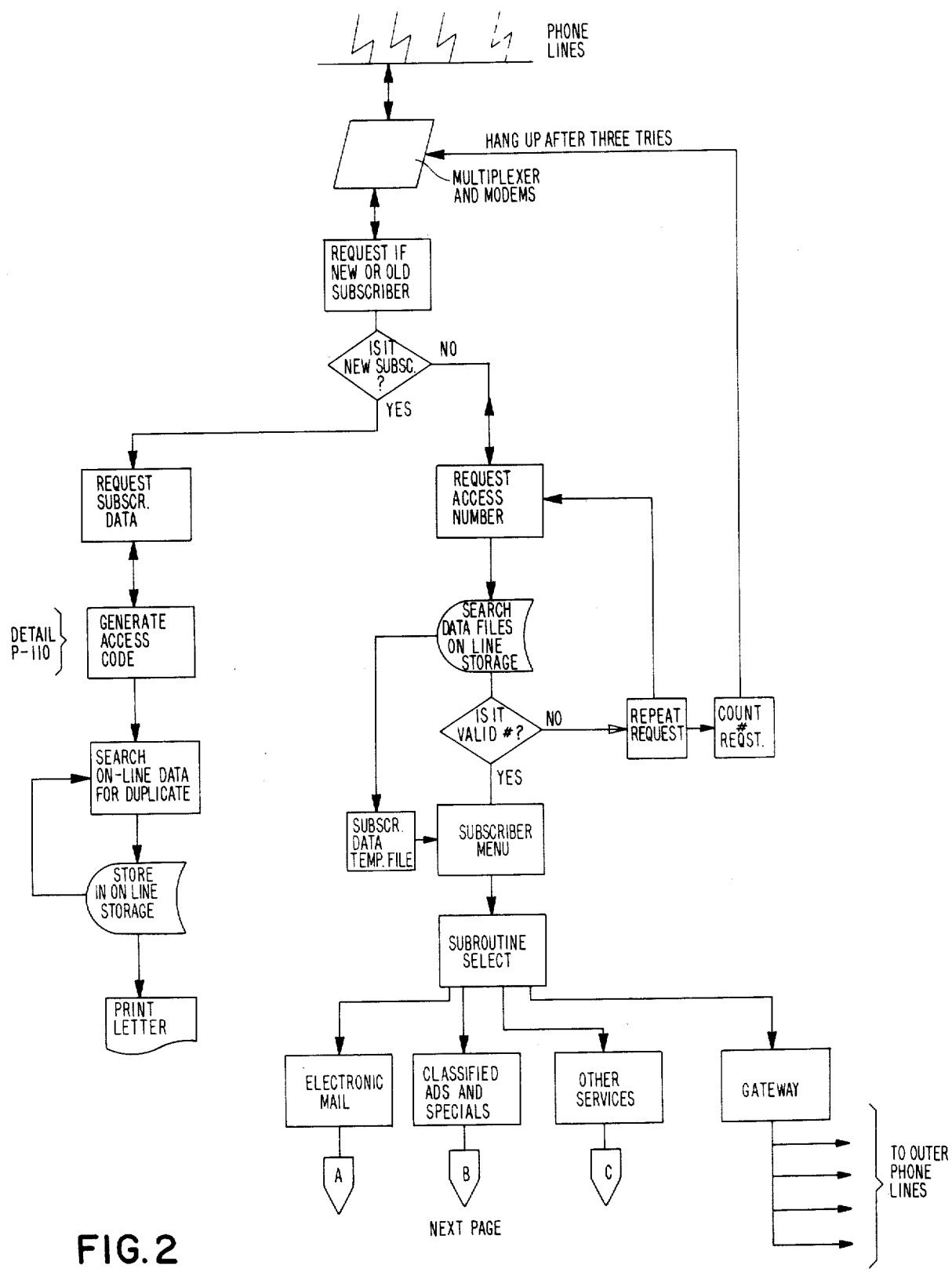
FIG. 2 is a flow chart of the subscriber system access.

The flow chart of FIG. 2 illustrates how a subscriber, without payment of any fee, accesses the system. As illustrated in this figure, the subscriber reaches the main computer through the telephone lines. The access preferably takes place through a free 800 number.

After connection to the computer via the 800 line and modem the computer initializes a "pre-processor" program.

This program has several functions.

1. It checks all incoming signals for special characters. (i.e. undersired control characters which may cause computer malfunctions). These are stripped from the incoming stream of data and not permitted to pass (through to the processor).

2. It checks if the incoming phone line is connected to an authorized modem, by comparison with a stored file.

3. It starts the main program and prevents the subscriber from accessing any other program in the system by issuing a command to the computer.

4. It produces a welcome message.

He is then asked whether he is a new or old subscriber. If a new subscriber, it is requested that he furnish data, including mailing address, telephone number, and name. After the requested data has been entered by the subscriber, an access code is generated, as will be described in greater detail with reference to FIG. 3. The system then carries out a search to see whether the generated access code is a duplicate of a previously assigned access code. It it is found that the newly generated access code has not previously been used, the system prints out a letter to the subscriber, informing him of the access code. The letter is mailed to the address which the subscriber furnished to the system. This completes the routine for a new subscriber.

If, on the other hand, the subscriber states that he is not a new subscriber, his access number is requested. When the access number has been entered by the subscriber, the data files or addressed segments of data storage are searched to see whether the number is or is not a valid number. If it is not a valid number, the request for the access number is repeated. If, after a predetermined number of requests, for example three requests, the subscriber still has not entered a valid access number, the system hangs up. If, on the other hand, a valid access number is furnished, the subscriber menu is presented to the subscriber, with instructions to select a particular area. The areas or subroutines include an electronic mail subroutine, a classified ad subroutine, other services, and a gateway to outgoing phone lines which, for example, may connect with other data bases. The other data bases may, for example, allow the purchase of tickets to shows and concerts, sales of items from catalogs, airlines reservations, etc.

Figure 3:
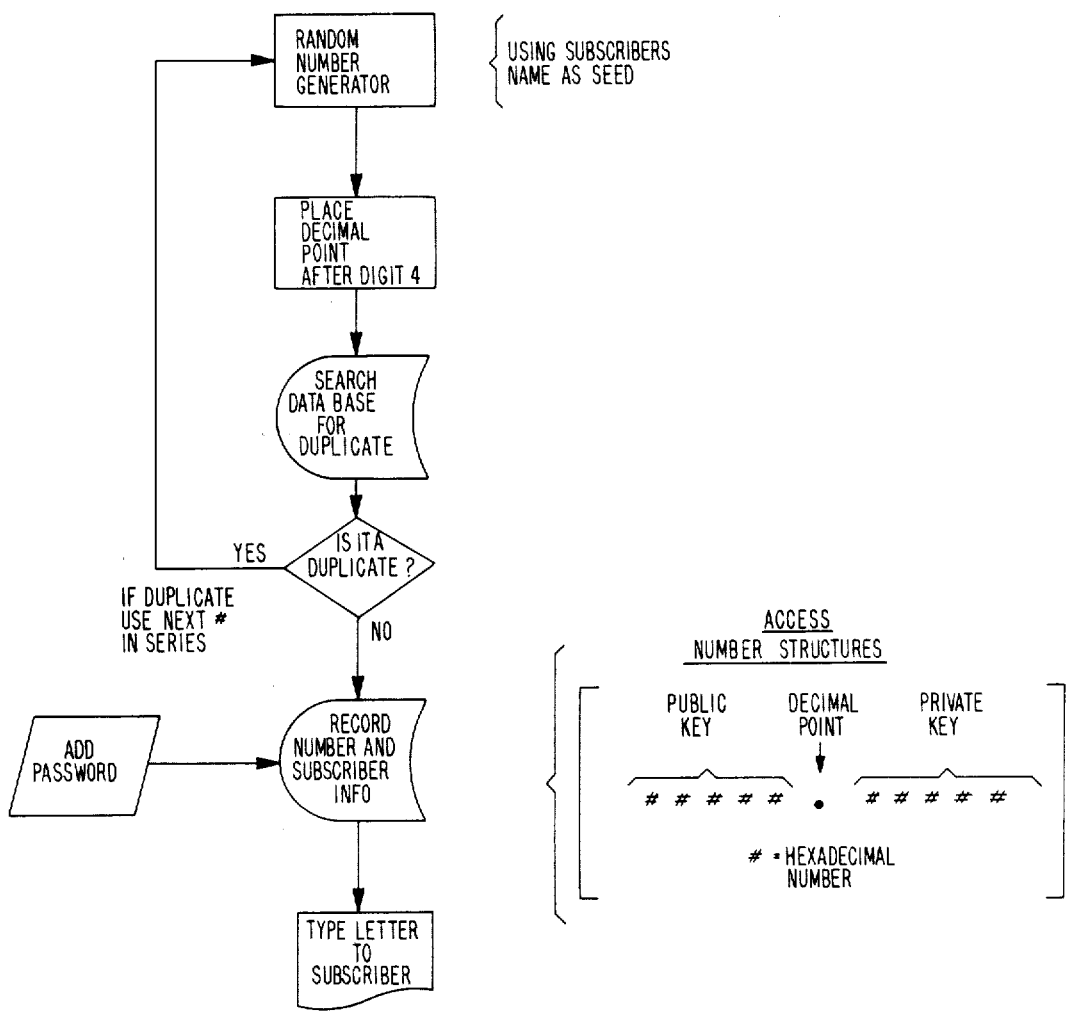
FIG. 3 is a detailed flow chart of the access code generator of FIG. 2.

The access code generator of FIG. 3 commences operation by generating a random number, using the subscriber's name as seed. Such random number generation is well known, and need not be described in detail here.

The random number which is generated is an 10 digit number, a decimal point being placed after the digit number 5. Thereafter, the data base is searched for a duplicate, as mentioned in connection with FIG. 2. If it is a duplicate, the random number generation is repeated. If it is not a duplicate, the access number and the information given by the subscriber is entered into the data base. A password is added to the recorded information. The password and access number are then included in a letter typed to the subscriber. In a preferred embodiment, the access number is a hexadecimal number, the first 5 digits constituting a public key, while the last 5 digits constitute a private key. The function of the two keys will be described in greater detail in connection with FIG. 4, the electronic mail subroutine.

Figure 4:
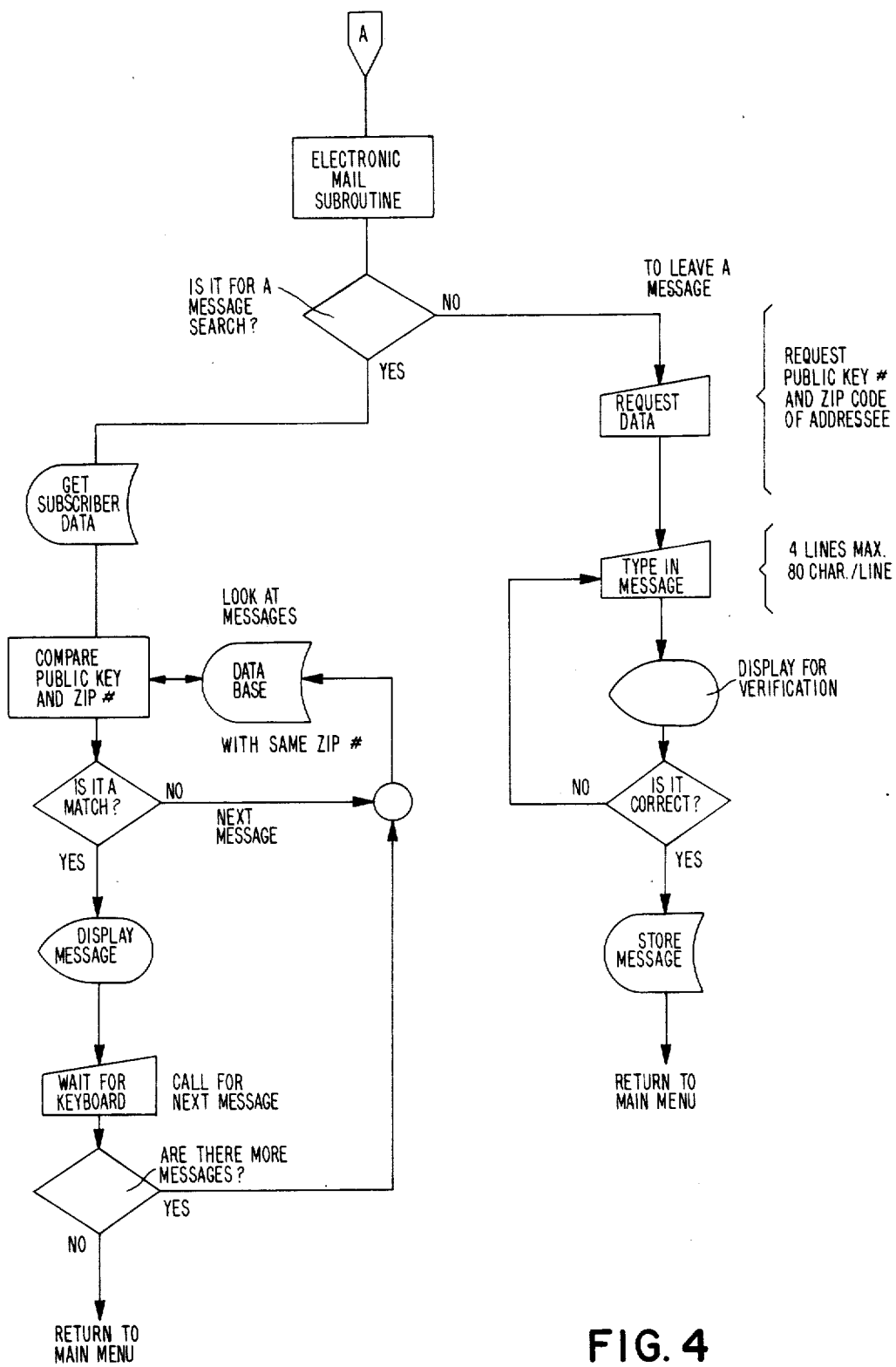
FIG. 4 is a flow chart for the electronic mail subroutine.

In FIG. 4, the subscriber has selected the electronic mail area from the menu presented to him in FIG. 2. He is first asked whether he wishes to read mail or send mail. If the former, the system searches for a file with his public key appended. The data base is accessed and searches until a coincidence is found. When this happens, the message is displayed, the display time being controlled by the subscriber. When the subscriber is ready for the next message, he activates a predetermined key on the keyboard. The next message is then displayed. Each message includes the public key of the sender, so that the subscriber is able to answer, if necessary.

If the subscriber wishes to send a message, he answers the question whether his request is a message search in the negative. He is then requested to enter the public key of the addressee. After this is given, he is asked to type in his message. A predetermined maximum is set, for example 4 lines with a maximum of 40 characters per line. After the message has been entered, it is transmitted back and displayed for verification. The subscriber then indicates by a keyboard entry whether the message is or is not correct. If it is not correct, he is requested to retype it. If it is correct, the message is stored, and the subscriber sending the message is returned to the main menu.

Figure 5:
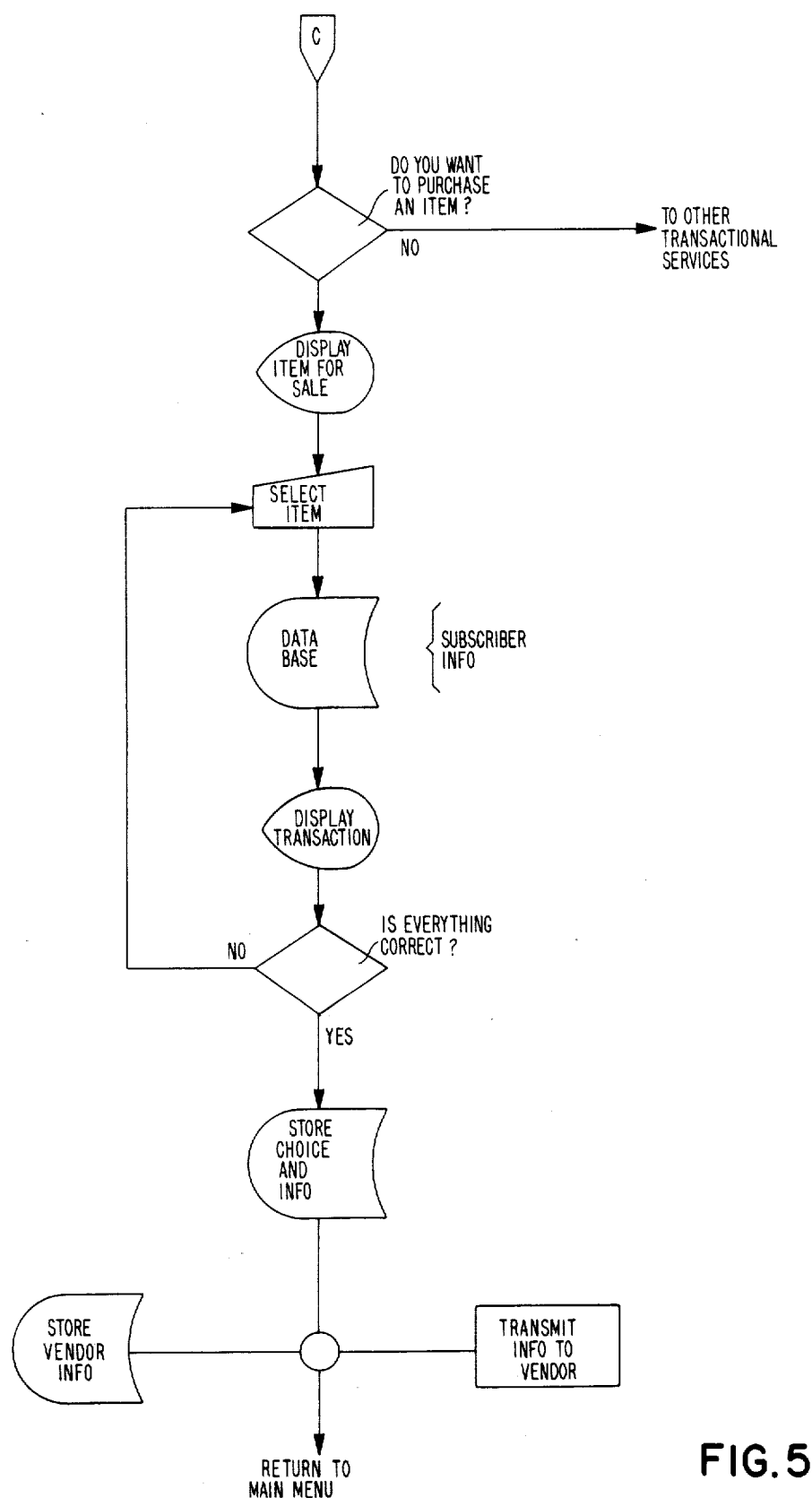
FIG. 5 is a flow chart for a typical transaction carried out by the system of the present invention.

If the subscriber wishes to make a purchase, he selects the transactional subroutine shown in FIG. 5.

If he wishes to make a purchase, he must first select the category or catalog offering of the item he wishes to purchase. This selection is made in response to a menu displayed on his screen. Once a vendors catalog selection has been made, the system comes back with a further menu arranged either as to price range, size, special feature or characteristics, or any other arrangement suitable for the particular items to be purchased. The items for sale in the so narrowed category are then displayed on the subscriber's screen. A keyboard input selects a particular item. Whereupon the screen displays more detailed information about the item. He is then asked if he indeed wishes to purchase the item. If yes, he is asked the quantity wanted and whether this is to be paid COD or by credit card.

If the transaction is by credit card, the credit card number is requested and checked by a credit card verification algorithm, utilizing both the credit card number and expiration date.

If the search indicates that the credit card is a valid card, the details of the transaction are displayed on the subscriber's screen. If the subscriber indicates by activating a key on the keyboard that the transaction is correct, the choice of any item he has made is stored in the section of the data base assigned to the particular subscriber. The information as to subscriber name, address, choice and public key is also stored in the vendor's section, and a corresponding letter is transmitted to the vendor. The letter also includes a bill for services rendered.

The subscriber, after he has made his selection, is asked whether he wishes to make an additional purchase. If not, he is returned to the main menu. If he does wish to purchase another item, the above-described routine is repeated.

Figure 6:
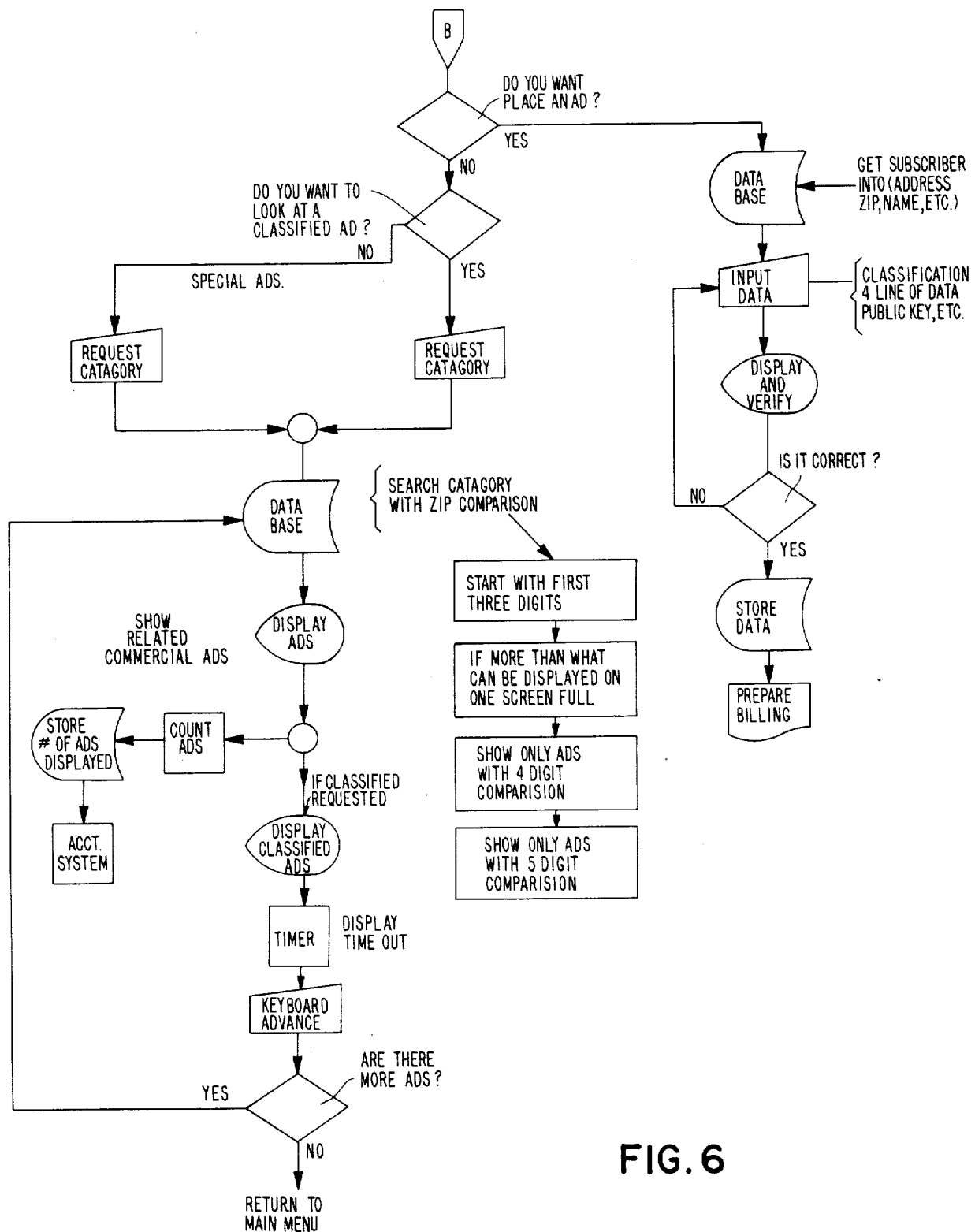
FIG. 6 is a flow chart for the classified advertising subroutine, according to the present invention.

In the classified advertising subroutine illustrated in FIG. 6, the subscriber first indicates whether he wishes to place an ad or not. If he indicates that he does not wish to place an ad, he is asked whether he wishes to look at classified ads. If not, the program is switched to the special ad section. The special ads are similar to, for example, newspaper ads from a commercial vendor. They occupy more room than the classified ads, will generally have graphics, and are charged at a different rate. In general, classified ads are entered by the subscriber directly and are paid for per time period, e.g. at $10.00 a week. The commercial or special ads are paid for both by the month and on a per inquiry basis. It is therefore necessary to keep track of the number of times any given ad was displayed.

To continue, after the subscriber has indicated that he wishes to view special ads, a category menu is presented, and the subscriber makes a selection. In the data base, a search with ZIP code comparison is first carried out. The ZIP code number of the subscriber is, it will be remembered, available to the system, since the subscriber had to furnish his access number when first accessing the system (FIG. 2).

The system first determines how many ads would be displayed if all ads from venders having the same first three digits in the ZIP code were to be displayed. If this is more than a predetermined number, e.g. more than can, for example, be displayed on three full screens, then a comparison using the first four zip code digits is carried out. If this too yields an excessive number of items, only ads within the given category for which the vendor ZIP code corresponds exactly to the subscriber's ZIP code will be displayed.

The display of the ads then can take place at the speed desired by the subscriber. After a given screenfull has been displayed, the subscriber initiates the next display by activating a key on his keyboard. A number of ads for a given vendor which have been viewed is stored under the vendor's access number, so that a charge can be made for the viewing. Special services might be provided, such as, for example, indicating the profession, age, and other grouping of the viewer of the ad. Such services would of course involve additional charges.

If the subscriber chooses to view classified ads, a category selection is made, and a full screen of classified ads (e.g. 80 characters across and 24 lines downwards)

is activated after a ZIP code comparison is detailed with regard to the special ads.

In the preferred embodiment, the classified ad displayed operates under control of a timer, not under the viewer's control. If there are further ads, these are displayed one screenfull at a time. When the number of ads has run out, the viewers return to the main menu.

If the subscriber indicated, at the start of the subroutine, that he wished to place an ad rather than view ads, he is asked for the Zip Code, in which he wants his ad to appear, and the classification into which the ad should be placed. After he has selected the category, he is asked to furnish the text of the classified ad.

After entry of the desired as has been completed, the completion is indicated by a key-board signal. The data is transmitted to the main computer unit, which transmits it back for viewing on the screen for verification. If the subscriber indicates that the text is incorrect, the data entry routine is repeated. If the information displayed is correct, the subscriber so indicates, and the ad text is stored under the correct classification and corresponding billing data is entered. so that the bill can, for example, be prepared off-line by an operator calling for a computer print-out of a particular billing section.

It is to be noted again that subscribers are not charged for access to the system, either at a flat rate or per unit time. There may, however, be a need to allocate time per viewer when the system is in a higher use. This is implemented as follows; each telephone line has a modem associated with it. The computer, as it answers the phone lines via modem, assigns a process ID number to each active modem, and also indicates the time at which the modem became active. The number of process ID numbers is then counted, and if equal to the number of available telephone lines, the timing program commences.

It is first determined whether the user is currently engaged in a revenue-raising activity, e.g. a purchase of an item, or a non-revenue raising activity such as, for example, viewing community events. If it is a non-revenue raising activity, the computer compares the current time to the time assigned to each process ID number, and takes appropriate action when the elapsed time exceeds a predetermined limit. This action includes a warning and subsequently the communication is cut off. If it is a revenue raising activity, additional time is added to the clock.

A check is also carried out to determine whether the subscriber has activated the key-board within the previous five minutes. Whenever it is determined that no activity from the subscriber has occurred, he is assumed to have walked away and will be signed off.

While the invention has been illustrated in a preferred embodiment, it is not to be limited to the apparatus and computer routines shown, since many variations thereof will be evident to one skilled in the art and are intended to be encompassed in the present invention as set forth in the following claims.

I claim:

1. A transactional system serving subscribers in a plurality of localities, comprising a national data base having
    a plurality of groups of addressed segments of data storage, each group storing data pertaining to an associated one of said localities, each group being addressable by a locality number,
    a plurality of access-number addressed segments of data storage, each assigned to one of said subscribers and storing a locality number for said one of said subscribers,
    means for linking said access-number addressed segments of data storage to said groups of locality number addressed segments of data storage, so that locality data stored in the group of locality number addressed segments of data storage associated with a subscriber's locality number is automatically addressed upon receipt of said subscriber's access number,
    wherein at least one of said localities comprises a plurality of sub-localities,
    wherein each of said locality numbers has a predetermined number of digits signifying said localities, and at least one additional digit for identifying respective sub-localities,
    wherein said locality numbers are zip code numbers,
    wherein said groups of addressed segments of data storage comprise classified ad sections, each having a respective number of ads stored therein,
    wherein said linking means comprises
    means for retrieving a subscriber zip code from said access number addressed segments of data storage in response to entry of said subscriber's access number,
    means for addressing groups of data storage segments using the retrieved zip code number and for counting the number of ads in any locality number addressed segments of data storage corresponding to localities having the same first 3 digits as said retrieved zip code, and
    means for transmitting to a subscriber controlled data access means the so counted ads, if said number of ads is less than a predetermined maximum ad number, or transmitting only sub-locality ads in locality number addressed segments of data storage having zip codes having the same first 4 digits as said retrieved zip code, if the so counted number of ads exceeds said predetermined maximum number; and
    said subscriber-controlled data access means comprising a plurality of subscriber units, each having a locality number corresponding to a geographic location thereof, each subscriber having an access number,
    means for transmitting said access number to said national data base,
    display means for displaying locality data received from said national data base, and
    means for said national data base to receive and process said access-numbers.

2. A transactional system as set forth in claim 1, further comprising means for storing "ad viewed" data indicative of subscribers viewing of a given ad in "ad viewed" data storage locations.

3. A transactional system as set forth in claim 1, further comprising subscriber controlled selection means for selecting an item from one of said transmitted classified ad, means in said data base for transmitting subscriber data and selected item identifying data back to said subscriber, means receiving a verification signal from said subscriber when the so transmitted data is correct, and means for storing said selected item and subscriber data upon receipt of said verification signal;
    wherein said selected item is sold by a predetermined vendor; and
    wherein said data base further comprises means for transmitting selected item data and subscriber data to said vendor.

4. A transactional system serving subscribers in a plurality of localities, comprising
   a national data base having
      a plurality of groups of addressed segments of data storage, each group storing data pertaining to an associated one of said localities, each group being addressable by a locality number,
      a plurality of access-number addressed segments of data storage, each assigned to one of said subscribers and storing a locality number for said one of said subscribers,
   means for linking said access-number addressed segments of data storage to said groups of locality number addressed segments of data storage, so that locality data stored in the group of locality number addressed segments of data storage associated with a subscriber's locality number is automatically addressed upon receipt of said subscriber's access number,
   wherein said national data base is accessible by non-subscribers and comprises
      access code generating means including a random number generator for generating an access-number for any non-subscriber who attempts to access said data base, and
   means for storing the so generated access-number in one of said access number-addressed segments of data storage,
      wherein said non-subscriber further furnishes his home address to said national data base,
      wherein said access number is mailed to said non-subscriber at said home address, whereby said non-subscriber becomes a subscriber; said transactional system further comprising
   subscriber-controlled data access means, including a plurality of subscriber units, each having a locality number corresponding to a geographic location thereof, each subscriber having an access number,
      means for transmitting said access number to said national data base,
      means for transmitting data to said subscriber-controlled data access means,
      display means for displaying locality data received from said national data base, and
      means for said national data base to receive and process said access-numbers.

5. A transactional system as set forth in claim 4, wherein said access code is a number comprising a private key and a public key.

6. A transactional system in set forth in claim 5, wherein said access code is a hexadecimal number, and wherein said private key comprises the first 5 digits and said public key comprises the second 5 digits of said hexadecimal number.

7. A transactional system as set forth in claim 5, wherein said data base further comprises subscriber initiated means for placing classified ads for storage in said groups of locality number addressed segments of data storage, said ad placing means comprising input data receiving means for receiving ad data and said public key from an advertising subscriber, transmit means for transmitting said ad data back to said advertising subscriber for verification, and means for storing said ad data and billing said advertising subscriber in response to a verification signal indicative of correctness of said ad from said advertising subscriber.

8. A transactional system as said forth in claim 5, further comprising an electronic mail system, wherein messages including said public key of a mail sending subscriber are stored at a receiving subscriber message location indentified the receiving subscriber's public key; and wherein so-stored messages are transmitted to said receiving subscriber in response to a message request and the receiving subscriber's access code.

9. A transactional system as set forth in claim 5, wherein each of said subscribers further has a password; and wherein said national data base requires said access number and said password for entry thereto.

10. A transactional system serving subscribers in a plurality of localities, comprising
   a national data base having
      a plurality of groups of addressed segments of data storage, each group storing data pertaining to an associated one of said localities, each group being addressable by a locality number,
      a plurality of access-number addressed segments of data storage, each assigned to one of said subscribers and storing a locality number for said one of said subscribers,
   means for linking said access-number addressed segments of data storage to said groups of locality number addressed segments of data storage, so that locality data stored in the group of locality number addressed segments of data storage associated with a subscriber's locality number is automatically addressed upon receipt of said subscriber's access number,
   subscriber controlled data access means having a plurality of subscriber units each having a locality number corresponding to its geographic location,
   each subscriber having an access-number, wherein said data access means comprises means for transmitting said access-number to said national data base, and display means for displaying locality data received from said national data base,
   a predetermined number of telephone lines linking said subscriber controlled data access means to said national data base,
   wherein said national data base further comprises means for answering subscriber calls, means for assigning a process identification number to each received call, means for comparing the number of process identification numbers to said predetermined number of telephone lines, and means for commencing timing of said calls when said number of process identification numbers is equal to said predetermined number of telephone lines,
   wherein said transactional system further comprises revenue-producing transactions and non-revenue transactions, and
   wherein said means for commencing timing of said calls delays timing of said revenue-producing transactions relative to timing of said non-revenue producing transactions; and
   means for transmitting data to said subscriber controlled access means, and
   means for said national data base to receive and process said access-numbers.

* * * * *